US012382236B2

(12) United States Patent
Petroff et al.

(10) Patent No.: US 12,382,236 B2
(45) Date of Patent: Aug. 5, 2025

(54) SIGNAL PROCESSING METHOD

(71) Applicant: IRCAM AMPLIFY, Paris (FR)

(72) Inventors: Antoine Petroff, Paris (FR); Frédéric Amadu, Chelles (FR)

(73) Assignee: IRCAM AMPLIFY, Paris (FR)

( * ) Notice: Subject to any disclaimer, the term of this patent is extended or adjusted under 35 U.S.C. 154(b) by 252 days.

(21) Appl. No.: 18/203,561

(22) Filed: May 30, 2023

(65) Prior Publication Data

US 2023/0388733 A1 Nov. 30, 2023

(30) Foreign Application Priority Data

May 31, 2022 (FR) ...................................... 2205237

(51) Int. Cl.
*H04S 7/00* (2006.01)
*H04S 3/00* (2006.01)

(52) U.S. Cl.
CPC .............. *H04S 7/302* (2013.01); *H04S 3/008* (2013.01); *H04S 7/307* (2013.01);
(Continued)

(58) Field of Classification Search
CPC .......... H04S 5/005; H04S 7/302; H04S 3/008; H04S 7/307; H04S 2400/01;
(Continued)

(56) References Cited

U.S. PATENT DOCUMENTS

| | | | | |
|---|---|---|---|---|
| 2004/0136554 | A1 | 7/2004 | Kirkeby | |
| 2021/0352425 | A1 | 11/2021 | Pang et al. | |
| 2022/0377489 | A1 * | 11/2022 | Herre ...................... | H04S 7/302 |

OTHER PUBLICATIONS

International Search Report dated Jan. 9, 2023.

(Continued)

*Primary Examiner* — Paul Kim
(74) *Attorney, Agent, or Firm* — IPSILON USA, LLP

(57) ABSTRACT

A signal processing method transforms X input signals into M output signals. The method includes applying a decorrelation filter to the X input signals so as to generate N decorrelated signals $e_i$; and for each decorrelated signal $e_i$ determined, generating N delayed signals $e_{i,k}$ by applying a delay $\tau_k$ and a gain $g_k$ to each decorrelated signal $e_i$, the delays $\tau_k$ and the gains $g_k$ being chosen. For each decorrelated signal $e_i$, the delayed signals $e_{i,k}$ simulate a propagation of the decorrelated signal in a virtual space. The virtual space has N virtual loudspeakers and a virtual listening position that are distributed according to a predetermined geometry. For each value of k, summing the delayed signals $e_{i,k}$: $E_k=\Sigma_{i=1}^{N}e_{i,k}$; and determining M output signals, each output signal resulting from a linear combination of the N sums of the delayed signals $E_k$.

13 Claims, 3 Drawing Sheets

(52) U.S. Cl.
CPC ....... *H04S 2400/01* (2013.01); *H04S 2400/11* (2013.01); *H04S 2400/13* (2013.01)

(58) Field of Classification Search
CPC ............ H04S 2400/03; H04S 2400/09; H04S 2400/11; H04S 2400/13
USPC .......................................................... 381/303
See application file for complete search history.

(56) References Cited

OTHER PUBLICATIONS

Von Turckheim Friedrich et al: "Virtual Venues—An All-Pass Based Time-Variant Artificial Reverberation System for Automotive Applications", AES Convention 145; Oct. 2018, AES, 60 East 42nd Street, Room 2520 New York.

* cited by examiner

SIGNAL PROCESSING METHOD

RELATED APPLICATION

This application claims the benefit of priority from French Patent Application No. 22 05237, filed on May 31, 2022, the entirety of which is incorporated by reference.

TECHNICAL FIELD

The present invention relates to a signal processing method, in particular for processing audio signals.

PRIOR ART

There are numerous music formats that define, in computing terms, a structure of music content. In particular, a music format is characterized by a number of sound channels. Thus, depending on the music format, the music content is intended to be rendered via a specific hardware configuration.

Music content in stereophonic format, comprising two sound channels, is for example intended to be rendered on two loudspeakers, while music content in 5.1 format, comprising 6 sound channels, is intended to be rendered on 6 loudspeakers.

When sound content in a certain format is not rendered on the expected number of loudspeakers, listening to the content is worsened as a result. In particular, listening to stereophonic content on a home cinema installation, conventionally comprising 6 to 8 loudspeakers, does not allow a satisfactory immersive experience. The same applies when listening to music content in 5.1, 7.1, ambisonic or Dolby Atmos® format, comprising four or more channels, being rendered on headphones comprising only two loudspeakers.

There are spreading algorithms that are intended to output the music content on multiple loudspeakers. These algorithms make it possible for example to spread monophonic content over three or more loudspeakers. However, even though these algorithms make it possible to obtain a greater impression of spreading of the music content, the precision of the sound content is worsened by the addition of fuzziness to the sound content.

The addition of reverberation is also a known method for outputting monophonic content on multiple loudspeakers. This method consists in simulating listening to the sound content in a virtual room, taking into account the acoustics of the virtual room and in particular the resonance caused by the virtual room. However, this method distorts the content by adding resonance that is not initially present.

US 2021/352425 describes a method for processing a stereophonic signal, comprising forming a centre channel signal. US 2021/352425 describes a system for simulating an acoustic space aimed at modelling the real acoustics of a location.

The article by Von Türckheim Friedrich et al, "*Virtual venues—an all-pass based time-variant artificial reverberation system for automotive applications*", describes signal processing software for applications in the automotive sector. This article suggests a system comprising simulating an acoustic space aimed at recreating a real space.

US 2004/136554 discloses a method for processing a stereo signal intended to be output via two loudspeakers.

Generally speaking, the known methods do not make it possible to separately define a number of channels of the sound content, a number of loudspeakers of the installation intended to render the sound content, a resonance, a colour and a sound timbre. It is not possible, proceeding from monophonic sound content, to render this monophonic content via all of the loudspeakers of a 5.1 home cinema installation, while still keeping precise and detailed perception of the location of the music content, while introducing a feeling of sound immersion, and while preserving the integrity of the sound content, that is to say the original artistic intention.

SUMMARY OF THE INVENTION

There is therefore a need to address these problems. One aim of the present invention is to fully or partly address this need.

One subject of the invention is thus a signal processing method transforming X input signals $a_p$, p being an integer belonging to the interval [1, X], into M output signals $s_q$, q being an integer belonging to the interval [2, M], the method comprising the following steps:

a) applying a decorrelation filter to the X input signals $a_p$ so as to generate N decorrelated signals $e_i$, i being an integer belonging to the interval [1, N];

b) for each decorrelated signal $e_i$ determined in step a), generating N delayed signals $e_{i,k}$ by applying a delay $\tau_k$ and a gain $g_k$ to each decorrelated signal $e_i$, k being an integer belonging to the interval [1, N], the delays $\tau_k$ and the gains $g_k$ being chosen such that, for each decorrelated signal $e_i$, the delayed signals $e_{i,k}$ simulate a propagation of the decorrelated signal in a virtual space, the virtual space comprising N virtual loudspeakers and a virtual listening position that are distributed according to a predetermined geometry, c) for each integer value of k belonging to the interval [1, N], summing the delayed signals $e_{i,k}$ using the following formula:

$$E_k=\Sigma_{i=1}^{N}e_{i,k} \quad \text{[Math 1]}$$

d) optionally, duplicating the delayed signals $e_{i,k}$ determined in step b), and for each duplicated signal $e_{i,k,j}$, j being an integer greater than or equal to 1, applying a delay $\varepsilon_{i,k,j}$, and then summing the delayed duplicated signals $e_{i,k}(t-\varepsilon_{i,k,j})$, using the following formula: for each integer value of k within the interval [1, N], for each value of j, $$F_{k,j}=\Sigma_{i=1}^{N}e_{i,k}(t-\varepsilon_{i,k,j}) \quad \text{[Math 2]}$$

e) determining M output signals, each output signal $s_q$ resulting from a linear combination of the N sums of the delayed signals resulting from step c), $E_k$, and, when a step d) is implemented, of the j*N sums of duplicated signals resulting from step d), $F_{k,j}$.

The method according to the invention makes it possible in particular to render music content comprising X input channels on an installation comprising M physical loudspeakers. By virtue of the method according to the invention, it is possible to obtain M output signals from X input signals without these having been altered and, in particular, without these having been compressed or there having been any loss of precision.

A method according to the invention makes it possible to render music content in a format comprising X input channels on M physical loudspeakers, without compression or addition of sound fuzziness, M being other than X.

Preferably, no reflection or reverberation is added to the music content.

In one embodiment, M is greater than X.

In step a), the decorrelation filter may comprise an all-pass filter, or a whitening filter, or the application of random delays to the input signals $a_p$, for example the application of relatively short delays, the delays preferably being less than 10 ms, or the application of a discrete cosine transform to the input signals $a_p$.

The number of decorrelated signals generated in step a) may be between 1 and the larger value out of X and M; in other words, N may be an integer within the interval [1, max(M, X)].

In one preferred embodiment, N is equal to the maximum of M and X, N=max(M, X).

A small number of decorrelated signals makes it possible to minimize the computing resources needed to implement steps a) to e), whereas a large number of decorrelated signals makes it possible to improve the final listening quality. A number of decorrelated signals equal to the maximum of X and N advantageously minimizes the computing resources needed while still having a satisfactory listening quality.

In step b), for each $e_i$, N delayed signals $e_{i,k}$ are determined, each delayed signal $e_{i,k}$ being able to be associated with a simulation of listening to the signal $e_i$ through a virtual loudspeaker $H_k$ of the virtual space, for a fixed value of k, k being an integer belonging to the interval [1; N]. For example, $e_{1,1}$ may simulate listening to a decorrelated signal $e_1$ through the virtual loudspeaker $H_1$ of the virtual space, $e_{1,1}$ being determined by applying a delay $\tau_1$ and a gain $g_1$ associated with the virtual loudspeaker $H_1$.

In step b), each delay $\tau_k$ may be associated with a virtual loudspeaker $H_k$ of the virtual space. Likewise, each gain $g_k$ may be associated with a virtual loudspeaker $H_k$ of the virtual space.

The delays $\tau_k$ may be determined based on the distance between each virtual loudspeaker $H_k$ and the virtual listening position in the virtual space, based on the speed of sound in a vacuum c.

In one particular embodiment, a user may modify the number and/or the position of the virtual loudspeakers, and/or the virtual listening position in the virtual space.

The gains $g_k$ may be computed based on the distance between each virtual loudspeaker and the virtual listening position in the virtual space. The further away the virtual loudspeaker is from the virtual listening position, the lower the gain associated with this virtual loudspeaker will be. The virtual listening position may be modified. In one embodiment, it is preset.

The virtual space may be a resonance-free space.

In particular, the virtual space does not include any feature aimed at modelling real acoustics. In one preferred embodiment, the predetermined geometry of the virtual space is determined so as to minimize an interaural cross-correlation coefficient (IACC hereinafter).

The IACC is an index of similarity between signals coming from two ears able to be used to model a spatial perception of sound content. If two signals coming from two ears are called g(t) and d(t), the interaural cross-correlation coefficient is defined, in the time domain, by:

$$\varphi gd(\delta) = \lim_{T\to\infty} 1/2T \int g(t)\cdot d(t+\delta)dt \quad \text{[Math 3]}$$

as a function of the time offset δ.

The lower the IACC, the greater the feeling of immersion for a user listening to the sound content.

As an alternative or in addition, the predetermined geometry is determined so as to minimize variations in frequency levels resulting from frequency responses of the delayed signals. Advantageously, such a geometry makes it possible to limit artefacts potentially present in the frequency response of the delayed signals $e_{i,k}$.

Preferably, the virtual space is infinite or equivalent to an anechoic chamber, that is to say that there is no resonance in this virtual space; in other words, the virtual space is a resonance-free space. In particular, the virtual space does not contain any obstacle that reflects the signal. The absence of resonance makes it possible in particular to preserve the original artistic intention.

The method according to the invention may comprise, before step b), in particular before step a), selecting a predetermined geometry of the virtual space. Preferably, the predetermined geometry is selected by specifying a number of virtual loudspeakers of the virtual space.

Optional step d) has the advantage of boosting the feeling of immersion by multiplying the number of signals around the delayed signals. The delayed signals are said to be densified.

Preferably, J is equal to 1, thus boosting the feeling of immersion while still limiting the computing power needed to generate these duplicated signals.

In step e), the linear combination of the N sums of delayed signals and, when a step d) is implemented, of the j*N sums of duplicated signals, may comprise fixed coefficients.

The coefficients may vary depending on the intensity desired for each of the M output signals. In particular, the coefficients may depend on a real installation configuration comprising M physical loudspeakers by way of which the M output signals are intended to be transmitted.

The coefficients may all be equal, listening to sound content via the real installation then giving a feeling of omnidirectional envelopment. As an alternative, the coefficients may be higher for output signals intended to be transmitted via the physical loudspeakers of the real installation that are located in front of the user than the coefficients of output signals intended to be transmitted via the physical loudspeakers of the real installation that are located behind the user, listening to sound content by the user via the real installation then giving a feeling of frontal envelopment.

Generally speaking, the linear combination in step e) may comprise coefficients determined based on the desired feeling of envelopment. The desired feeling of envelopment may in particular be chosen from among a feeling of side, frontal, rear and omnidirectional envelopment, this list not being limiting.

In one preferred embodiment, the coefficients are determined such that, for a fixed value of k, the coefficient applied to $E_k$ is equal to the coefficient applied to $F_{k,j}$, for any value of j.

Step e) may comprise the following steps:

- for any value of k, summing $E_k$ and $F_{k,j}$ for any value of j, so as to obtain a vector of size (1, N), composed of the sums of $E_k$, $F_{k,j}$;
- multiplying the vector by a matrix of size (N, M) determined on the basis of the coefficients of the linear combination, the matrix being able to be defined by all of the coefficients $\alpha_{k,q}$, k being an integer belonging to the interval [1, N] and q being an integer belonging to the interval [1, M].

The matrix may be defined by the following coefficients:

- for any value of k=q, $\alpha_{k,q}$ is equal to 1,
- for any value of k other than q, $\alpha_{k,q}$ is less than 1 and greater than or equal to 0.

When N=M, the matrix may be a unitary matrix.

When N=M, the matrix may be a circulant matrix with $\alpha_{1,1}$ equal to 0, $\alpha_{1,q}$ less than 1 and greater than or equal to 0, for a value of q other than 1. In particular, the circulant matrix may comprise $\alpha_{1,2}$ less than 1 and greater than 0, $\alpha_{1,q=M}$ less than 1 and greater than 0 and $\alpha_{1,q}$ equal to 0 for a value of q other than 1, 2, and M, $\alpha_{1,q=M}$ preferably being equal to $\alpha_{1,2}$.

For example, for N=M=5, the matrix may be equal to:

$$\begin{pmatrix} \alpha_{1,1} & \dots & \alpha_{1,M} \\ \vdots & \ddots & \vdots \\ \alpha_{N,1} & \dots & \alpha_{N,M} \end{pmatrix} = \begin{pmatrix} 1 & g & 0 & 0 & g \\ g & 1 & g & 0 & 0 \\ 0 & g & 1 & g & 0 \\ 0 & 0 & g & 1 & g \\ g & 0 & 0 & g & 1 \end{pmatrix}, \quad \text{[Math 4]}$$

with $$g \in ]0, 1[$$

A coefficient of 1 may be replaced by applying a gain of 0 dB.

A coefficient less than 1 and greater than or equal to 0 may be replaced by applying a negative gain in decibels (dB).

The method according to the invention may comprise, before step e), in particular before step a), selecting coefficients for the linear combination in step e), preferably by selecting a desired feeling of envelopment.

Steps a), b), c), d), when it is implemented, and e) may be computer-implemented.

In one embodiment, M is greater than or equal to three and X is equal to two.

The method may be used to transform two input signals into at least three output signals, better still at least four output signals, even better still at least five output signals, even better still at least six output signals. The use of a method transforming two input signals into three or more output signals is particularly advantageous for rendering content in stereophonic format on speakers in a motor vehicle or on speakers in a concert hall or in a movie theatre or on speakers of a home cinema installation.

In one alternative embodiment, M is equal to two and X is greater than or equal to four.

The method may be used to transform at least four, at least five or better still at least six input signals into two output signals. The use of a method transforming four or more input signals into two output signals is particularly advantageous for rendering content in Dolby Atmos®, ambisonic, 5.1, 7.1 format on the two speakers of headphones.

The invention also relates to the use of a method according to the invention to output:

- stereophonic music content comprising two input signals via loudspeakers of a motor vehicle, or
- stereophonic music content comprising two input signals via loudspeakers of a home cinema system or of a Dolby Atmos® system comprising at least six loudspeakers, better still at least eight loudspeakers, even better still at least ten loudspeakers, or
- stereophonic music content comprising two input signals in a concert hall comprising four or more loudspeakers, or
- audio content comprising at least four input signals, preferably six input signals, via headphones comprising two loudspeakers.

The invention also relates to a computer program comprising instructions that, when the program is executed by a computer, prompt said computer to implement the signal processing method according to the invention.

Preferably, the virtual space, in particular the predetermined geometry of the virtual space and/or the values of the gains $g_k$ and $\tau_k$, are stored in a database.

Multiple virtual-space geometries may be stored in a database. Before step a) or before step b), the predetermined geometry of the virtual space for implementing step b) may be selected from the database.

Multiple matrices determining coefficients for the linear combination in step e) may be stored in a database. Before step e), in particular before step a), a matrix is selected from the database for implementing step e) according to the invention.

The invention also relates to a system comprising:

- a computer program according to the invention,
- optionally a database, comprising at least the geometry of the virtual space for implementing step b) and at least one matrix comprising the coefficients of the linear combination for implementing step e).

The system may comprise an interface allowing the user to set the geometry of the virtual space and/or the coefficients of the linear combination. In particular, the user may set the coefficients of the linear combination by selecting a desired feeling of envelopment. In particular, the user may set the geometry of the virtual space by selecting a number of virtual loudspeakers of the virtual space.

The system may comprise a microprocessor containing the computer program according to the invention. The microprocessor may be embedded. The microprocessor may be contained in a telephone, a television set, a multimedia television box, a car radio, a computer, a tablet, a smartwatch. This list is not limiting.

A system according to the invention may furthermore comprise M physical loudspeakers intended to transmit the M output signals.

BRIEF DESCRIPTION OF THE DRAWINGS

Further features and advantages of the invention will become further apparent upon reading the following detailed description and from studying the attached drawing, in which.

DETAILED DESCRIPTION

Figure 1:
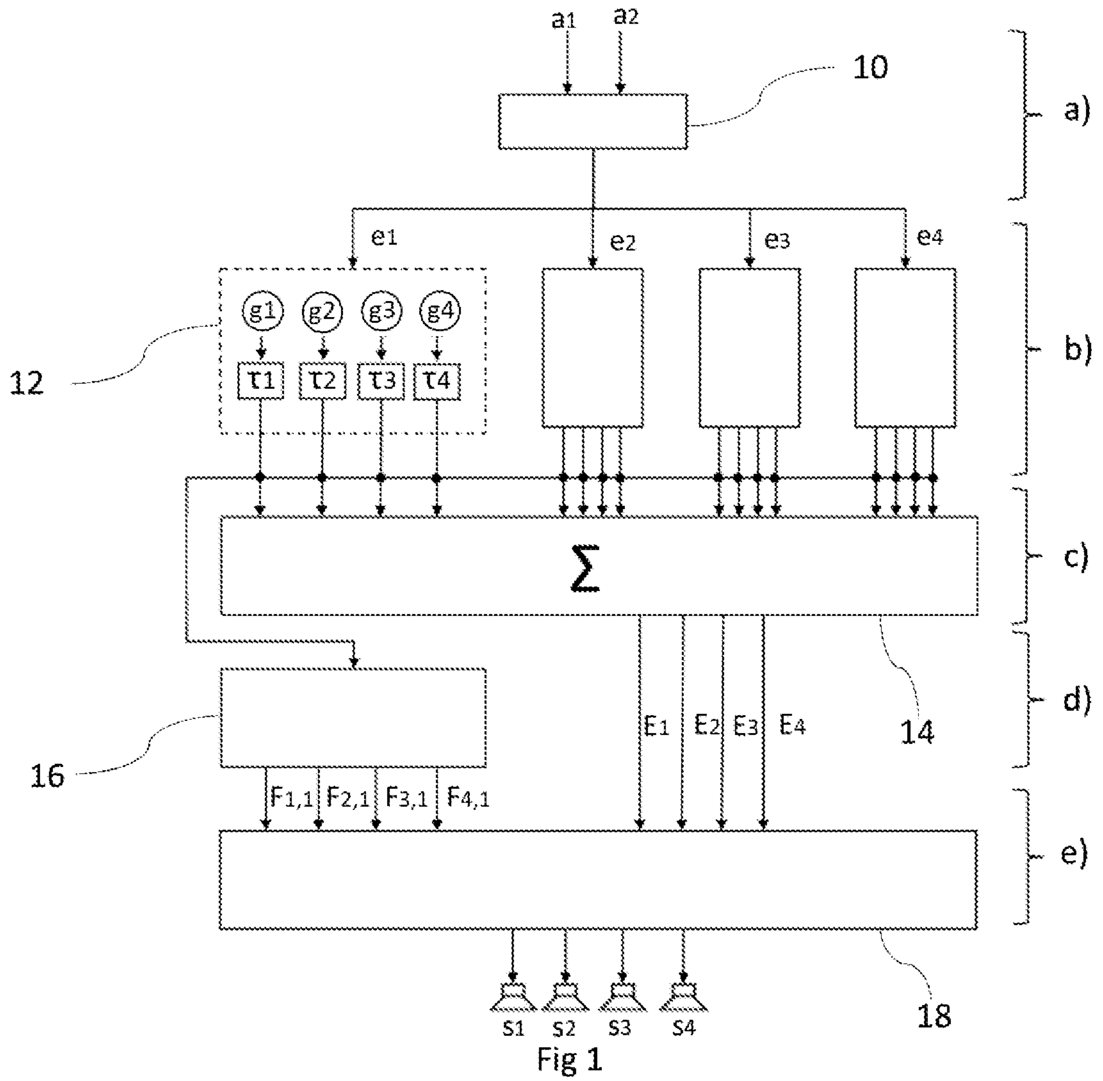
FIG. 1 illustrates one exemplary implementation of a method according to the invention, FIG. 2*a* schematically shows a plan view of one example of a predetermined geometry of the virtual loudspeakers and of the virtual listening position in a virtual space comprising 8 virtual loudspeakers, FIG. 2*b* schematically shows a side view of the example of a predetermined geometry from FIG. 2*a*.

FIG. 1 illustrates one exemplary implementation of a signal processing method according to the invention, wherein the number of input signals is equal to two (X=2) and the number of output signals is equal to four (M=4).

Step a)

In step a), a decorrelation filter 10 is applied to the X input signals $a_1$, $a_2$ so as to generate N decorrelated signals $e_i$, i being an integer belonging to the interval [1, N].

Preferably, the number of decorrelated signals generated is equal to the maximum of (X, M). In the example of FIG. 1, the number of decorrelated signals is four, N being equal to the maximum of (X, M)=max(2, 4).

The decorrelation filter 10 may comprise an all-pass filter, a whitening filter, or may comprise the application of random delays to the input signals $a_1$, $a_2$, the random delays preferably being less than 10 ms, or may comprise the application of a discrete cosine transform to the input signals $a_1$, $a_2$. Preferably, the decorrelation filter 10 is an all-pass filter.

Step a) may be implemented by way of a computing module 10.

Step b)

The decorrelated signals $e_1$, $e_2$, $e_3$, $e_4$ obtained at the end of step a) are then, in step b), delayed and amplified by applying a delay $\tau_k$ and a gain $g_k$:

$$e_{i,k}(t)=g_k \times e_i(t-\tau_k),\ k \in [\![ 1,N ]\!] \quad \text{[Math 5]}$$

In the example of FIG. 1, the following delayed signals $e_{i,k}$ are for example obtained:

for i=1:

$e_{1,1}(t)=g_1*e_1(t-\tau_1)$
$e_{1,2}(t)=g_2*e_1(t-\tau_2)$
$e_{1,3}(t)=g_3*e_1(t-\tau_3)$
$e_{1,4}(t)=g_4*e_1(t-\tau_4)$ for i=2:

$e_{2,1}(t)=g_1*e_2(t-\tau_1)$
$e_{2,2}(t)=g_2*e_2(t-\tau_2)$
$e_{2,3}(t)=g_3*e_2(t-\tau_3)$
$e_{2,4}(t)=g_4*e_2(t-\tau_4)$;

for i=3:

$e_{3,1}(t)=g_1*e_3(t-\tau_1)$
$e_{3,2}(t)=g_2*e_3(t-\tau_2)$
$e_{3,3}(t)=g_3*e_3(t-\tau_3)$
$e_{3,4}(t)=g_4*e_3(t-\tau_4)$ and for i=4:

$e_{4,1}(t)=g_1*e_4(t-\tau_1)$
$e_{4,2}(t)=g_2*e_4(t-\tau_2)$
$e_{4,3}(t)=g_3*e_4(t-\tau_3)$
$e_{4,4}(t)=g_4*e_4(t-\tau_4)$.

Each delay $\tau_k$ may be associated with a virtual loudspeaker $H_k$ of the virtual space. Likewise, each gain $g_k$ may be associated with a virtual loudspeaker $H_k$ of the virtual space.

In other words, the delayed signals $e_{1,1}$, $e_{2,1}$, $e_{3,1}$, $e_{4,1}$ result from a simulation of listening to the decorrelated signals $e_1$, $e_2$, $e_3$, $e_4$, respectively, through the virtual loudspeakers $H_1$, $H_2$, $H_3$, $H_4$ of the virtual space, respectively.

The delays $\tau_k$ and the gains $g_k$ depend on the geometry of the virtual space. To determine the delays $\tau_k$ and the gains $g_k$, it is therefore necessary to determine the geometry of the virtual space.

Virtual Space

The determination of the virtual space may result from the determination of the position of the virtual loudspeakers and of the virtual listening position of the virtual space.

The determination of the virtual space may be determined so as to minimize the IACC.

The determination of the virtual space may be determined so as to minimize the variations in frequency levels resulting from frequency responses of the delayed signals $e_{i,k}$.

In one preferred embodiment, the determination of the virtual space is determined so as to minimize the IACC and the variations in frequency levels resulting from a frequency response of the delayed signals $e_{i,k}$.

The virtual space is preferably a resonance-free space, that is to say that the virtual space does not contain any obstacle that reflects the signal. In particular, the virtual space is advantageously not a partially enclosed or enclosed virtual room. The absence of resonance makes it possible, inter alia, to preserve the original artistic intention.

In one particular embodiment, a user may modify the number and/or the position of the virtual loudspeakers, and/or the virtual listening position in the virtual space.

Multiple virtual spaces are preferably preset depending on the number of virtual loudspeakers desired.

Before step b), in particular before step a), the user may determine the geometry of the virtual space, for example by selecting a predetermined geometry from a database.

Depending on the number of decorrelated signals N, a predetermined virtual space is selected from among a set of virtual spaces based on the number of virtual loudspeakers of the virtual spaces of the set of virtual spaces, each virtual space of the set of virtual spaces comprising a single number of virtual loudspeakers.

Delays

Figure 2A:
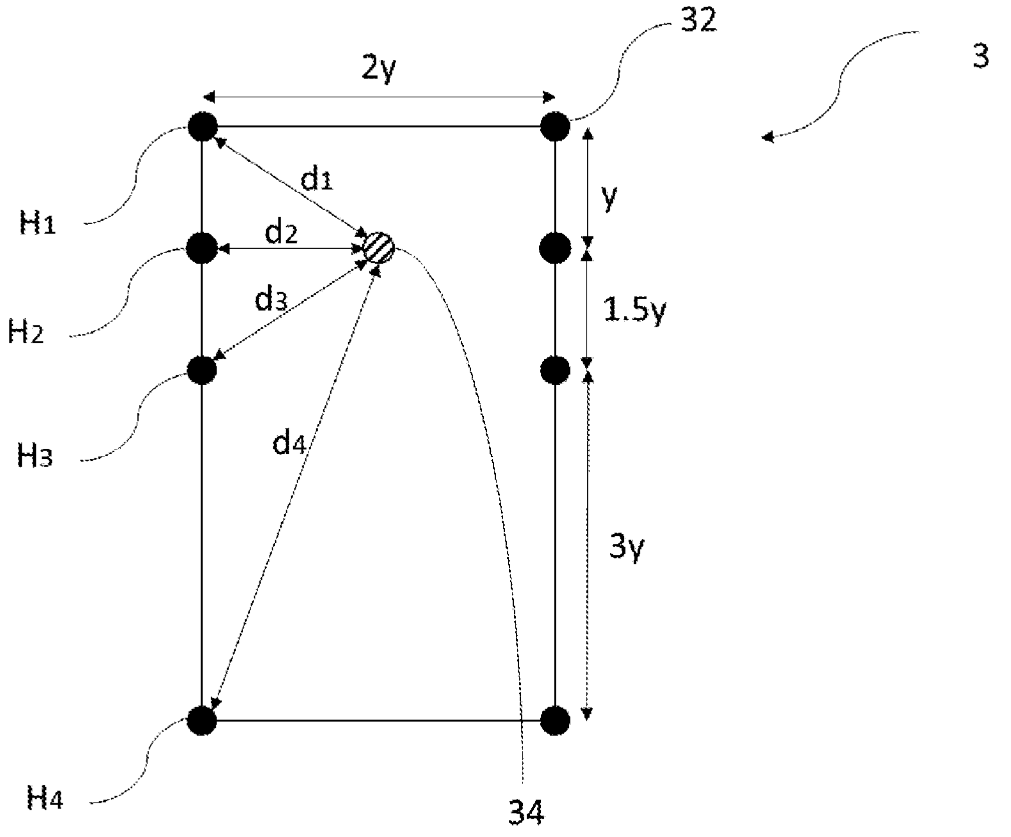
Figure 2B:
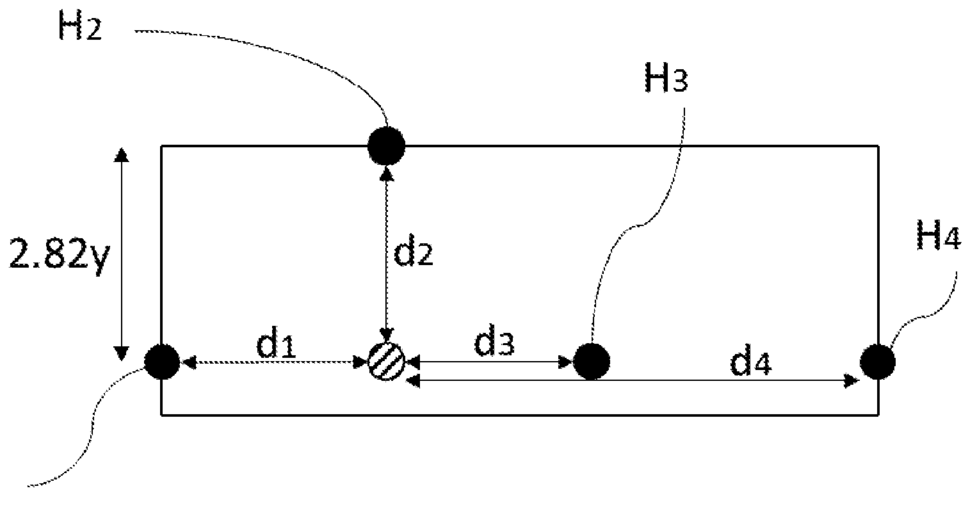

The delays $\tau_k$ may be determined based on the distance between each virtual loudspeaker and the virtual listening position in the virtual space, based on the speed of sound in a vacuum c, as illustrated in FIGS. 2*a* and 2*b*.

FIGS. 2*a* and 2*b* schematically show a virtual space 3 comprising eight virtual loudspeakers 32 and a virtual listening position 34. FIG. 2*a* shows a plan view of the virtual space 3 and FIG. 2*b* shows a side view of the virtual space 3. The values of $\tau_k$ may be determined as follows: $\tau_k=d_k/c$, where c is the speed of sound in a vacuum.

For the example of FIGS. 2*a* and 2*b*, the distances $d_1$, $d_2$, $d_3$, $d_4$ between the virtual listening position 34 and the virtual loudspeakers $H_1$, $H_2$, $H_3$ and $H_4$, respectively, are defined based on the parameter y. The following values of $\tau_k$ may be deduced therefrom:

$$\begin{cases} \tau_1 = \dfrac{d_1}{c} = \dfrac{\sqrt{2}\,y}{c} \\ \tau_2 = \dfrac{d_2}{c} = \dfrac{\sqrt{2.82^2+1}\,y}{c} \\ \tau_3 = \dfrac{d_3}{c} = \dfrac{2\sqrt{2}\,y}{c} \\ \tau_4 = \dfrac{d_4}{c} = \dfrac{\sqrt{4.5^2+1}\,y}{c} \end{cases} \quad \text{[Math 6]}$$

$\tau_1$ being associated with the virtual loudspeaker $H_1$ and computed based on the position of the virtual loudspeaker $H_1$ with respect to the virtual listening position 34, $\tau_2$ being associated with the virtual loudspeaker $H_2$ and computed based on the position of the virtual loudspeaker $H_2$ with respect to the virtual listening position 34, $\tau_3$ being associated with the virtual loudspeaker $H_3$ and computed based on the position of the virtual loudspeaker $H_3$ with respect to the virtual listening position 34, $\tau_4$ being associated with the virtual loudspeaker $H_4$ and computed based on the position of the virtual loudspeaker $H_4$ with respect to the virtual listening position 34.

Gains

In step b), the gains $g_k$ may be computed based on the distance between each virtual loudspeaker and the virtual listening position in the virtual space.

The gains may be determined according to the following criterion: the further away the virtual loudspeaker is from the virtual listening position, the lower the gain associated with this virtual loudspeaker will be.

The gains may be inversely proportional to the distance between the virtual loudspeakers at the virtual listening position.

A gain of 0 dB may be associated with the virtual loudspeaker closest to the virtual listening position.

The gains may be determined by applying an affine function, based on the distance between each virtual loudspeaker and the virtual listening position.

The gains $g_k$ may be computed by applying a function $f$ complying for example with the following relationship: for any distance d, $f(2d)=f(d)-6$ dB, preferably a gain of 0 dB being fixed for the distance between the virtual loudspeaker closest to the virtual listening position and the virtual listening position.

At the end of step b), this gives N times the number of virtual loudspeakers in the virtual space delayed signals. For the example of FIG. 1, this gives 16 delayed signals: $e_{1,1}$, $e_{1,2}$, $e_{1,3}$, $e_{1,4}$, $e_{2,1}$, $e_{2,2}$, $e_{2,3}$, $e_{2,4}$, $e_{3,1}$, $e_{3,2}$, $e_{3,3}$, $e_{3,4}$, $e_{4,1}$, $e_{4,2}$, $e_{4,3}$, $e_{4,4}$.

Step b) may be implemented by way of a computing module 12.

Preferably, the geometry of the virtual space and/or the gains and delays resulting from this geometry are stored in a database.

Step c)

In step c), the delay signals $e_{i,k}$ are summed using the formula:

$$E_k = \sum_{i=1}^{N} e_{i,k} \qquad \text{[Math 7]}$$

Each $E_k$ corresponds to a sum of the delayed signals resulting from the simulations of listening to the decorrelated signals $e_i$ through the virtual loudspeaker $H_k$ of the virtual space.

Step c) may be implemented by way of a computing module 14.

Step d)

In one preferred embodiment, the method according to the invention comprises optional step d). Optional step d) may take place in parallel with step c). Optional step d) take places after step b).

Optional step d) makes it possible to boost the feeling of immersion by multiplying the number of signals around the delayed signals. The greater J is, the greater the feeling of immersion will be.

Optional step d) comprises J duplication(s) of the delayed signals $e_{i,k}$, by applying a delay $\varepsilon_{i,k,j}$, J being an integer greater than or equal to 1. In one embodiment, J is equal to 1, boosting the feeling of immersion while still limiting the computing power needed to generate these duplicated signals.

The duplicated signals obtained by applying a delay $\varepsilon_{i,k,j}$ to a delayed signal oscillate around said delayed signal. The delay that is applied may be of the order of around one hundred μs.

The duplicated signals are obtained by applying the following formula:

$$f_{i,k,j}(t)=e_{i,k}(t-\varepsilon_{i,k,j}),\ j \text{ being an integer, } j\geq 1 \qquad \text{[Math 8]}$$

Optional step d) additionally comprises duplicating the delayed signals $e_{i,k}$, summing the duplicated signals $f_{i,k,j}$ using the following formula:

$$F_{k,j} = \sum_{i=1}^{N} f_{i,k,j}(t) = \sum_{i=1}^{N} e_{i,k}(t-\varepsilon_{i,k,j}) \qquad \text{[Math 9]}$$

Optional step d) may be likened to adding J virtual loudspeakers around the virtual loudspeakers of the virtual space.

A gain may be applied to the duplicated signals $f_{i,k,j}$ and/or to the sums of duplicated signals $F_{k,j}$.

In one embodiment, a single gain is applied to the duplicated signals $f_{i,k,j}$ and/or to the sums of duplicated signals $F_{k,j}$, depending on the desired sound level for the duplicated signals with respect to the delayed signals and in particular for the sums of duplicated signals with respect to the sums of delayed signals.

When step d) is implemented, the user may determine the number of duplications J be performed in step d), before step b), in particular before step a).

Optional step d) may be implemented by way of a computing module 16.

Step e)

In step e), the sums of signals resulting from step c), and optionally from step d), $E_k$, and optionally $F_{k,j}$ respectively, are combined through linear combination.

The coefficients of the linear combination may be determined manually by a user.

Preferably, the coefficients are predetermined depending on the intensity desired for each of the M output signals. The coefficients may depend on a real installation configuration comprising M physical loudspeakers by way of which the M output signals are intended to be transmitted.

In one embodiment, the user selects a desired feeling of envelopment, this selection of a desired feeling of envelopment making it possible to fix the coefficients.

For example, when the coefficients are all equal, an omnidirectional feeling of envelopment is given. As an alternative, the coefficients may be higher for output signals intended to be transmitted via the physical loudspeakers of the real installation that are located in front of the user than the coefficients of output signals intended to be transmitted via the physical loudspeakers of the real installation that are located behind the user, giving a feeling of frontal envelopment. In particular, for a feeling of frontal envelopment, a gain of 0 dB may be applied to the output signals intended to be transmitted via the physical loudspeakers of the real installation that are located in front of the user, a gain of −6 dB may be applied to the output signals intended to be transmitted via the physical loudspeakers of the real installation that are located to the sides, and a gain of −12 dB may be applied to the output signals intended to be transmitted via the physical loudspeakers of the real installation that are located behind the user.

The desired feeling of envelopment may be selected from among a feeling of side, frontal, rear and omnidirectional envelopment.

The coefficients may be preselected, the preselected coefficients defining coefficients that are selected by default in the absence of a selection made by the user.

Before step e), in particular before step a), the user may determine the coefficients of the linear combination for implementing step e), for example by selecting the coefficients from a database. Preferably, the coefficients are selected by selecting a desired feeling of envelopment, for example from a database.

Step e) may be implemented by way of a computing module 18.

The coefficients may be stored in a database 200.

Figure 3:
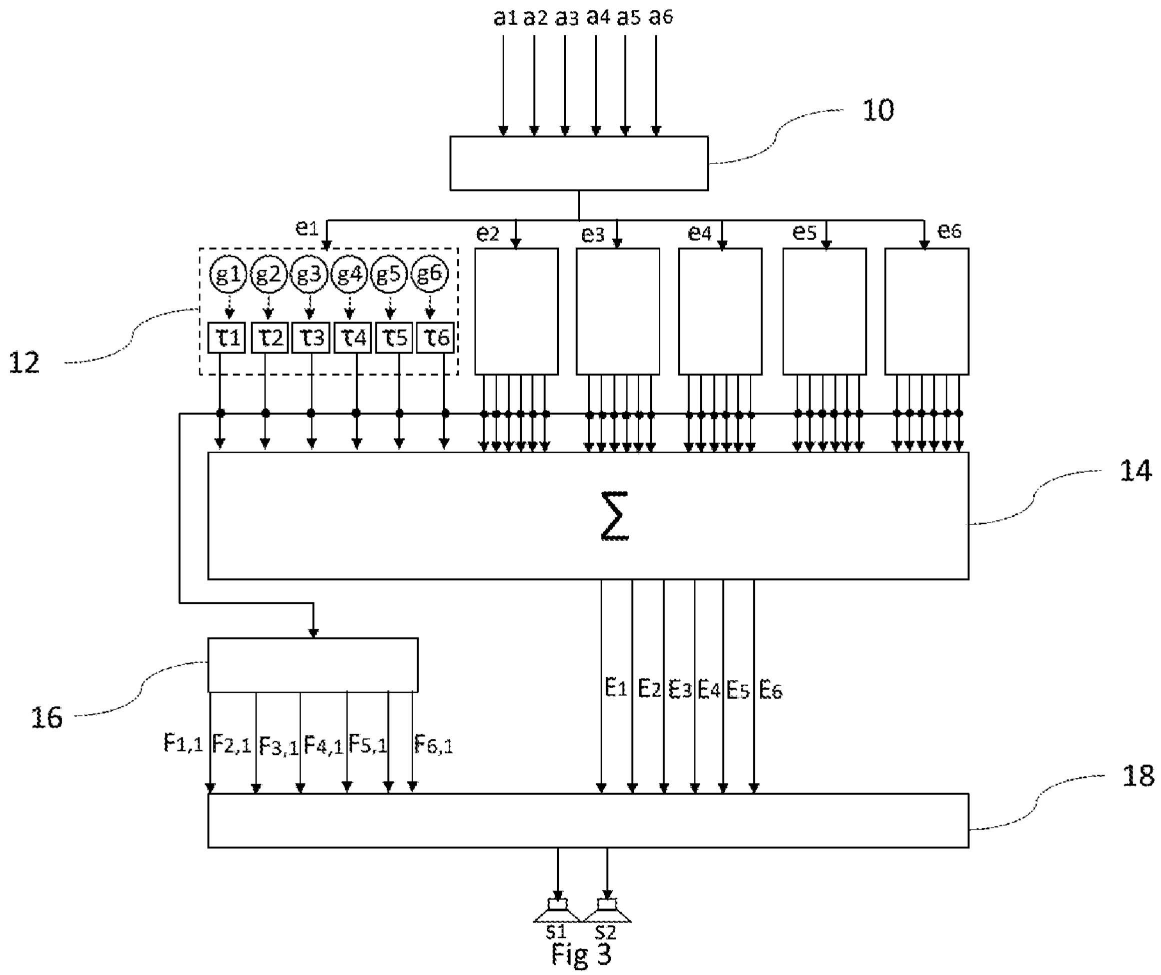
FIG. 3 illustrates another exemplary implementation of a method according to the invention, and FIG. 4 schematically shows a system for implementing a method according to the invention.

FIG. 3 illustrates another exemplary implementation of a signal processing method according to the invention, wherein the number of input signals is equal to six (X=6) and the number of output signals is equal to two (M=2).

The steps are similar to those described for the example of FIG. 1.

In this example, N is also equal to the maximum of M and X, here equal to 6.

In this example, J is equal to 1, that is to say that the delayed signals are duplicated once.

Figure 4:
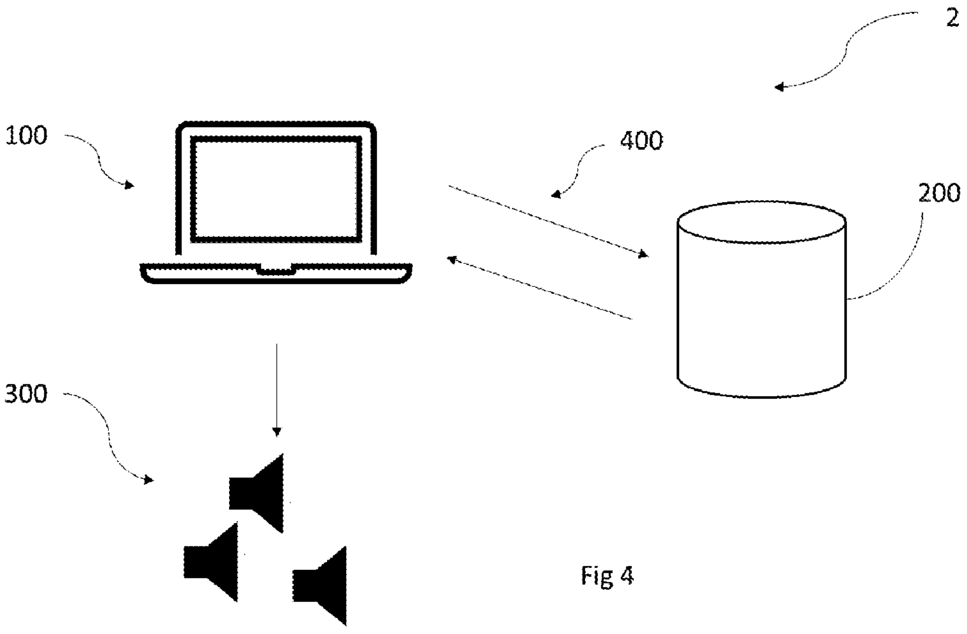

FIG. 4 schematically shows a system for implementing a method according to the invention.

The system 2 comprises:

A computer 100 comprising a computer program comprising instructions that, when the program is executed by the computer, prompt said computer to implement steps a), b), c) and e) of a signal processing method according to the invention, preferably to implement steps a), b), c), d) and e) of a signal processing method according to the invention, A database 200 containing at least one virtual space 3 geometry for implementing step b) of a method according to the invention, and/or at least one matrix determining the coefficients of a linear combination for implementing step e) of a method according to the invention;

Optionally M physical loudspeakers 300, intended to render the M output signals.

The database 200 may be integrated into the computer 100.

The system may comprise communication means 400 allowing the database to communicate with the computer 100.

The computer is understood to be any computing means for executing instructions.

A method according to the invention may advantageously be used to output:

stereophonic music content comprising two input signals via loudspeakers of a motor vehicle, or stereophonic music content comprising two input signals via loudspeakers of a home cinema system or of a Dolby Atmos® system comprising at least six loudspeakers, better still eight loudspeakers, even better still ten loudspeakers, or stereophonic music content comprising two input signals in a concert hall comprising preferably four or more loudspeakers, or audio content comprising at least four input signals, preferably six input signals, via headphones comprising two loudspeakers.

These use examples are not limiting.

Of course, the invention is not limited to the exemplary embodiments that have just been described.

In particular, the number of input signals and the number of output signals may vary. They advantageously depend on the desired use.

The invention makes it possible, inter alia, to guarantee improved spreading of the X input signals, that is to say spreading that retains the integrity of the signals and limits artefacts.

Unlike the known prior art, the invention does not aim to reproduce the acoustics of a room or of a real location. Indeed, the addition of early reflections and/or of late reverberation, although it has an impact on the feeling of immersion, modifies the original artistic intention. In particular, early reflections add a corresponding colour to the geometry of the room and to the acoustic quality of the walls of said room. A sound to which such reflections are added may then become muffled or, on the contrary, very clear.

Processing based on adding delayed reverberation modifies the resonance and the sonic depth perceived. A short and percussive sound to which delayed reverberation is added is perceived as lengthy and drowned out in the reverberation.

In addition, pre-processing operations and/or post-processing operations may be applied to the input and/or output signals, respectively. For example, equalizer filters, finite impulse response filters or biquad infinite impulse response filters may be applied to the input signals $a_p$ and/or output signals $s_q$ in order to modify the tone colour of the input signals $a_p$ and/or output signals $s_q$, respectively.

The invention claimed is:

1. A signal processing method transforming X input signals $a_p$, p being an integer belonging to the interval [1, X], into M output signals $s_q$, q being an integer belonging to the interval [2, M], M being other than X, the method comprising the following steps:

a) applying a decorrelation filter to the X input signals $a_p$ so as to generate N decorrelated signals $e_i$, i being an integer belonging to the interval [1, N];

b) for each decorrelated signal $e_i$ determined in step a), generating N delayed signals $e_{i,k}$ by applying a delay $\tau_k$ and a gain $g_k$ to each decorrelated signal $e_i$, k being an integer belonging to the interval [1, N], the delays $\tau_k$ and the gains $g_k$ being chosen such that, for each decorrelated signal $e_i$, the delayed signals $e_{i,k}$ simulate a propagation of the decorrelated signal in a virtual space, the virtual space comprising N virtual loudspeakers and a virtual listening position that are distributed according to a predetermined geometry, the virtual space being a resonance-free space, c) for each integer value of k belonging to the interval [1, N], summing the delayed signals $e_{i,k}$ using the following formula:

$$E_k=\Sigma_{i=1}^{N}e_{i,k};$$

d) duplicating the delayed signals $e_{i,k}$ determined in step b), and for each duplicated signal $e_{i,k,j}$, j being an integer greater than or equal to 1, applying a delay $\varepsilon_{i,k,j}$, and then summing the delayed duplicated signals $e_{i,k}(t-\varepsilon_{i,k,j})$, using the following formula: for each integer value of k within the interval [1, N], for each value of j, $$F_{k,j}=\Sigma_{i=1}^{N}e_{i,k}(t-\varepsilon_{i,k,j});\text{ and}$$

e) determining M output signals, each output signal $s_q$ resulting from a linear combination of the N sums of the delayed signals resulting from step c), $E_k$, and, when a step d) is implemented, of the j*N sums of duplicated signals resulting from step d), $F_{k,j}$.

2. The method according to claim 1, the virtual space being a resonance-free space.

3. The method according to claim 1, wherein the predetermined geometry of the virtual space is determined so as to minimize an interaural cross-correlation coefficient.

4. The method according to claim 1, wherein the predetermined geometry of the virtual space is determined so as to minimize variations in frequency levels resulting from frequency responses of the delayed signals.

5. The method according to claim 1, wherein the decorrelation filter comprises an all-pass filter, or a whitening filter, or the application of random delays to the X input signals $a_p$, or the application of a discrete cosine transform to the input signals $a_p$.

6. The method according to claim 1, wherein the linear combination in step e) comprises coefficients determined based on a desired feeling of envelopment, the desired feeling of envelopment being chosen from among a feeling of frontal, side, rear and omnidirectional envelopment.

7. The method according to claim 1, wherein N is an integer within the interval [1, maximum (X, M)].

8. The method according to claim 7, wherein N is equal to the maximum of X and M.

9. The method according to claim 1, comprising, before step a), selecting a predetermined geometry of the virtual space.

10. The method according to claim 9, wherein the predetermined geometry is selected by specifying a number of virtual loudspeakers of the virtual space.

11. The method according to claim 1, comprising, before step a), selecting coefficients for the linear combination in step e), the linear combination in step e) comprising coefficients determined based on a desired feeling of envelopment, the desired feeling of envelopment being chosen from among a feeling of frontal, side, rear and omnidirectional envelopment.

12. The method according to claim 11, the linear combination being chosen by selecting a desired feeling of envelopment.

13. The method according to claim 1, further comprising the steps of outputting any one of:

stereophonic music content comprising two input signals via loudspeakers of a motor vehicle, or stereophonic music content comprising two input signals via loudspeakers of a home cinema system or of a Dolby Atmos® system comprising at least six loudspeakers, or stereophonic music content comprising two input signals in a concert hall comprising four or more loudspeakers, or audio content comprising at least four input signals via headphones comprising two loudspeakers.

* * * * *